Sept. 2, 1952   C. W. LOTZ   2,609,098
METHOD OF AND APPARATUS FOR CONTINUOUSLY CLEANING AND
SEPARATING MINERALS OF DIFFERENT SETTLING RATES
Filed March 7, 1950   7 Sheets-Sheet 3
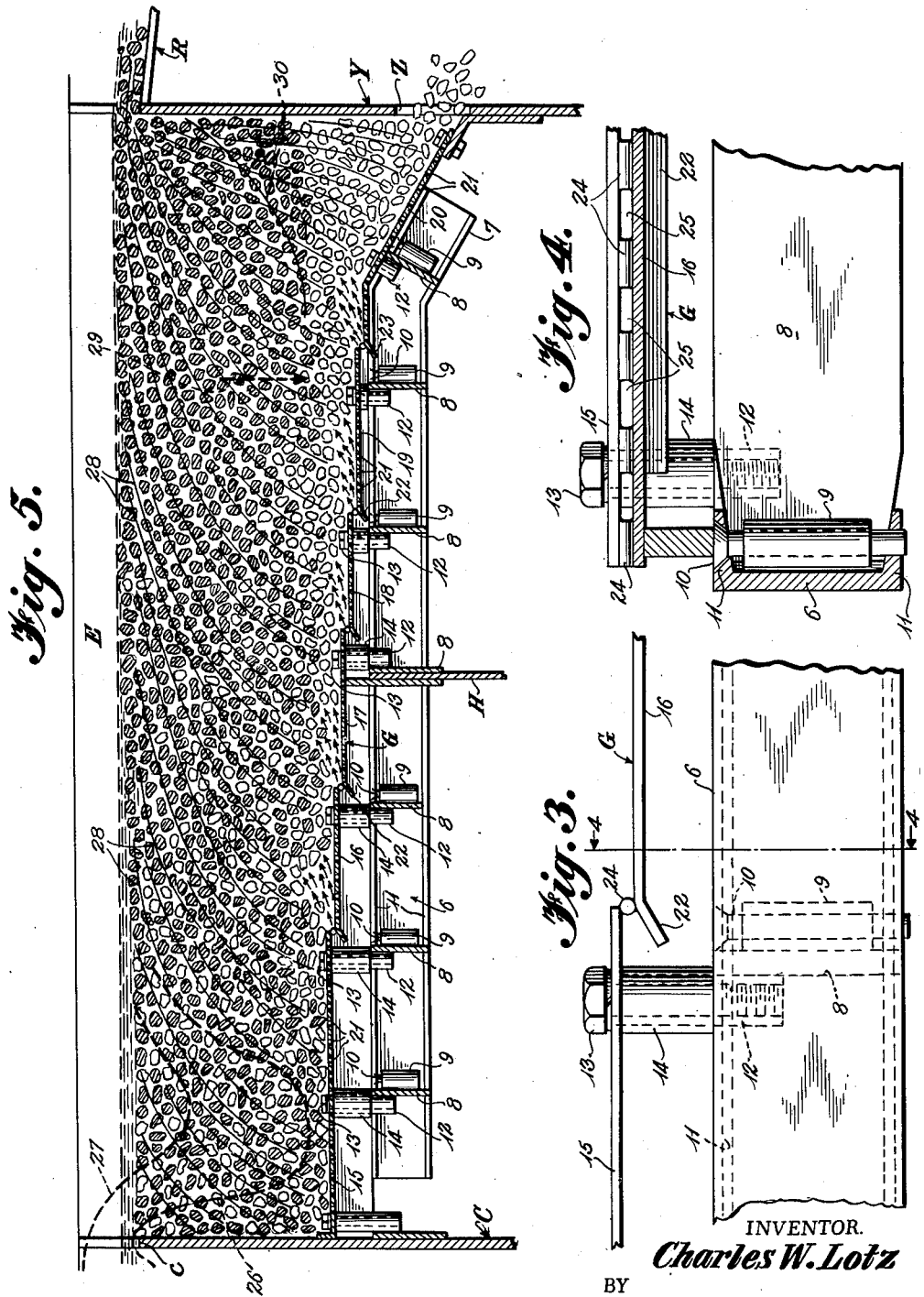
INVENTOR.
Charles W. Lotz
BY
L. Donald Meyer
ATTORNEY

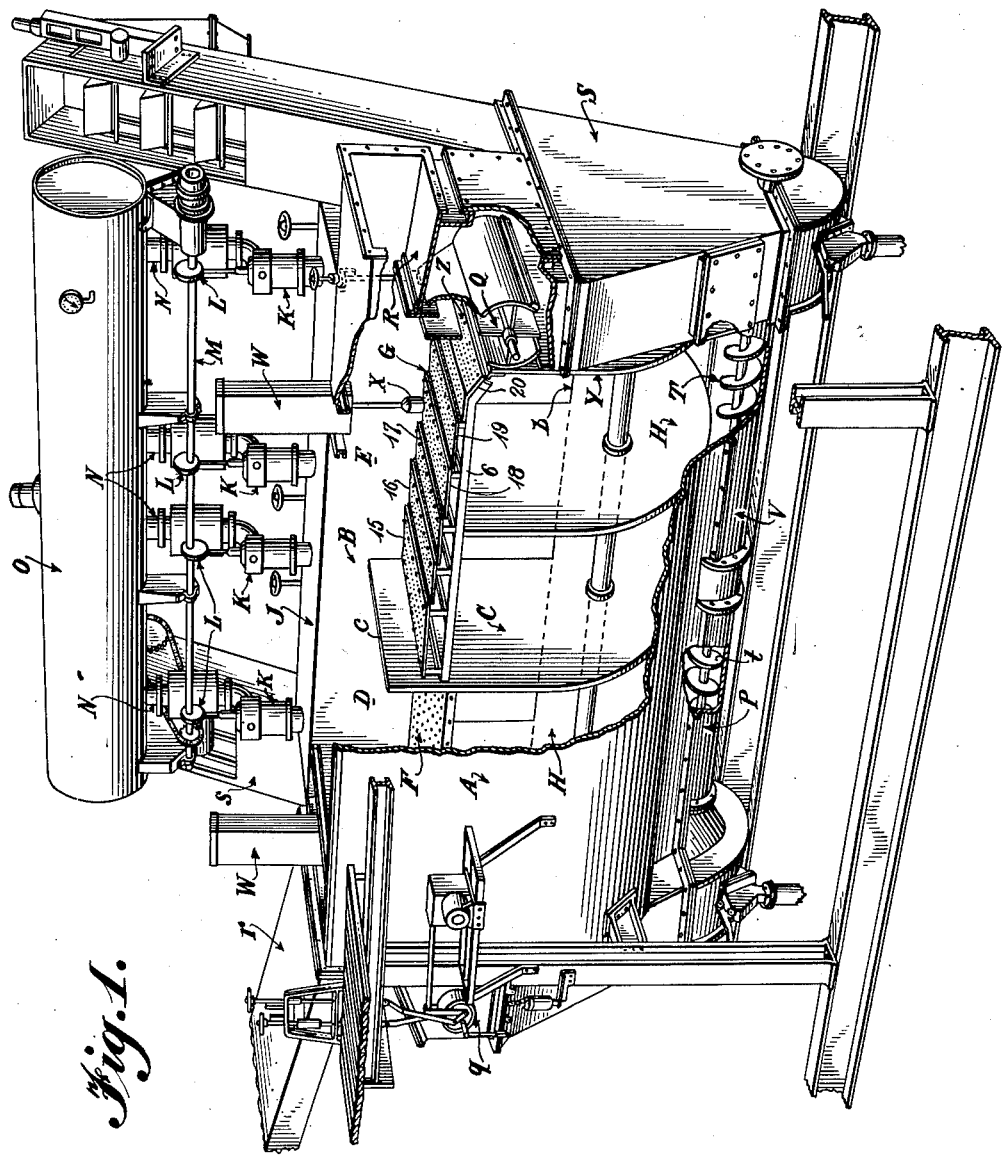

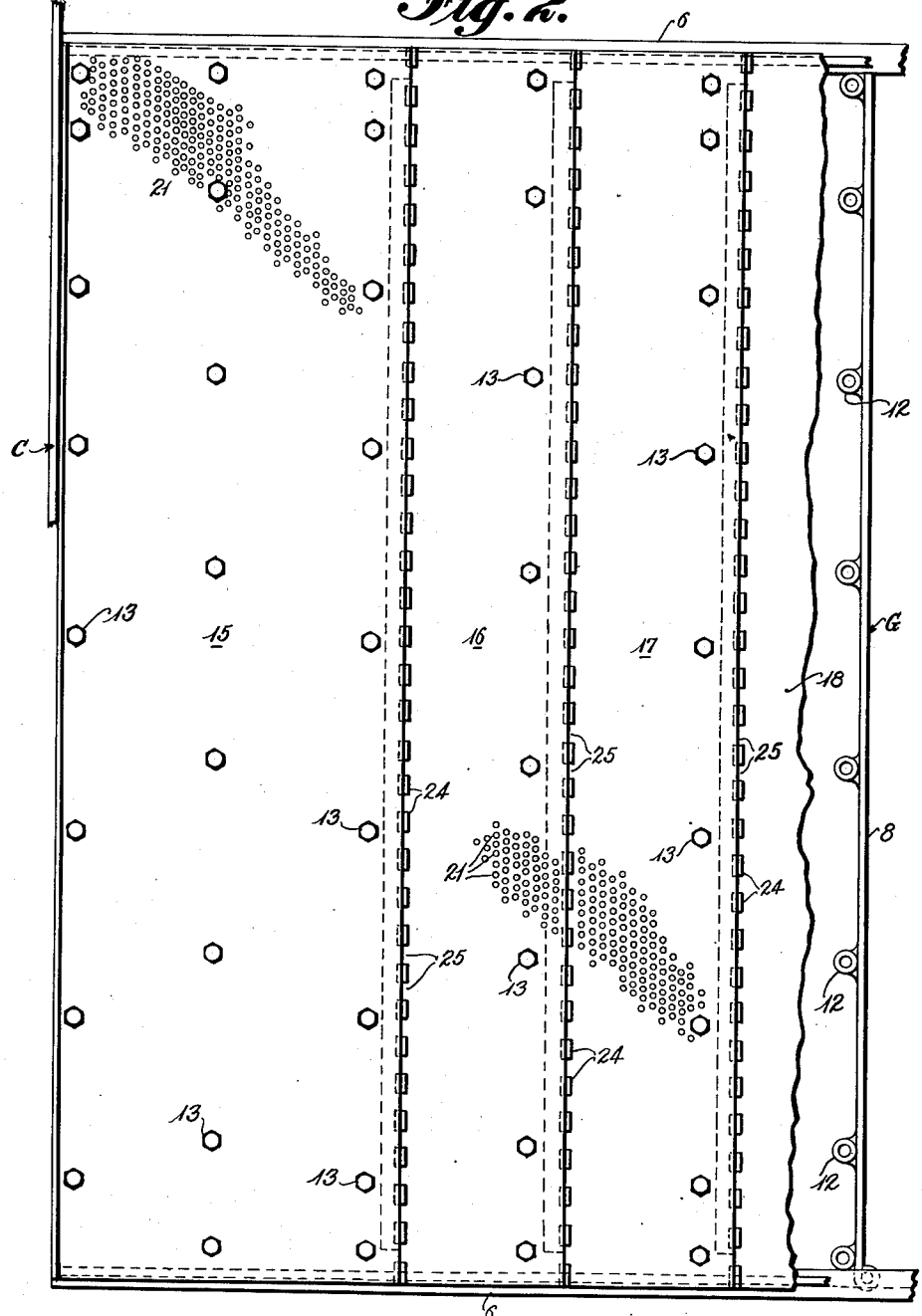

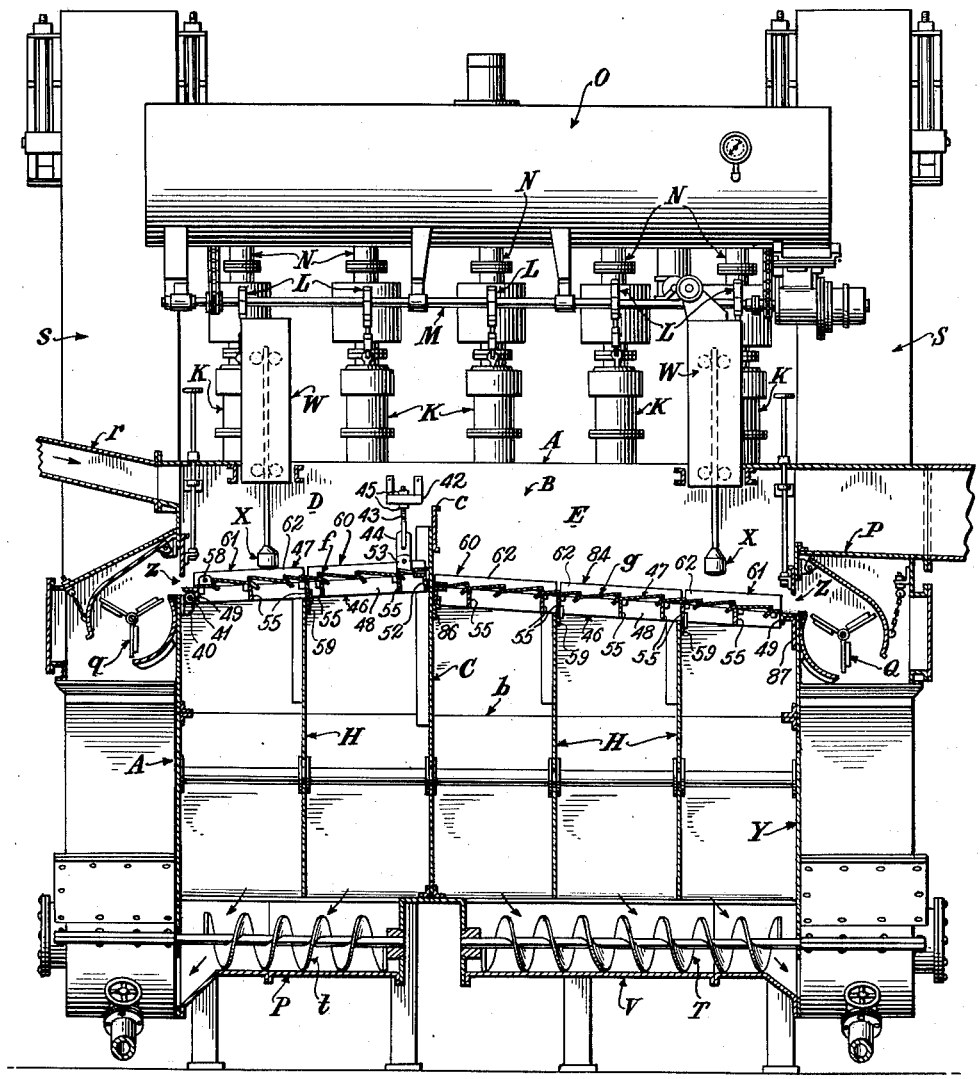

Sept. 2, 1952               C. W. LOTZ               2,609,098
METHOD OF AND APPARATUS FOR CONTINUOUSLY CLEANING AND
SEPARATING MINERALS OF DIFFERENT SETTLING RATES
Filed March 7, 1950                         7 Sheets-Sheet 5
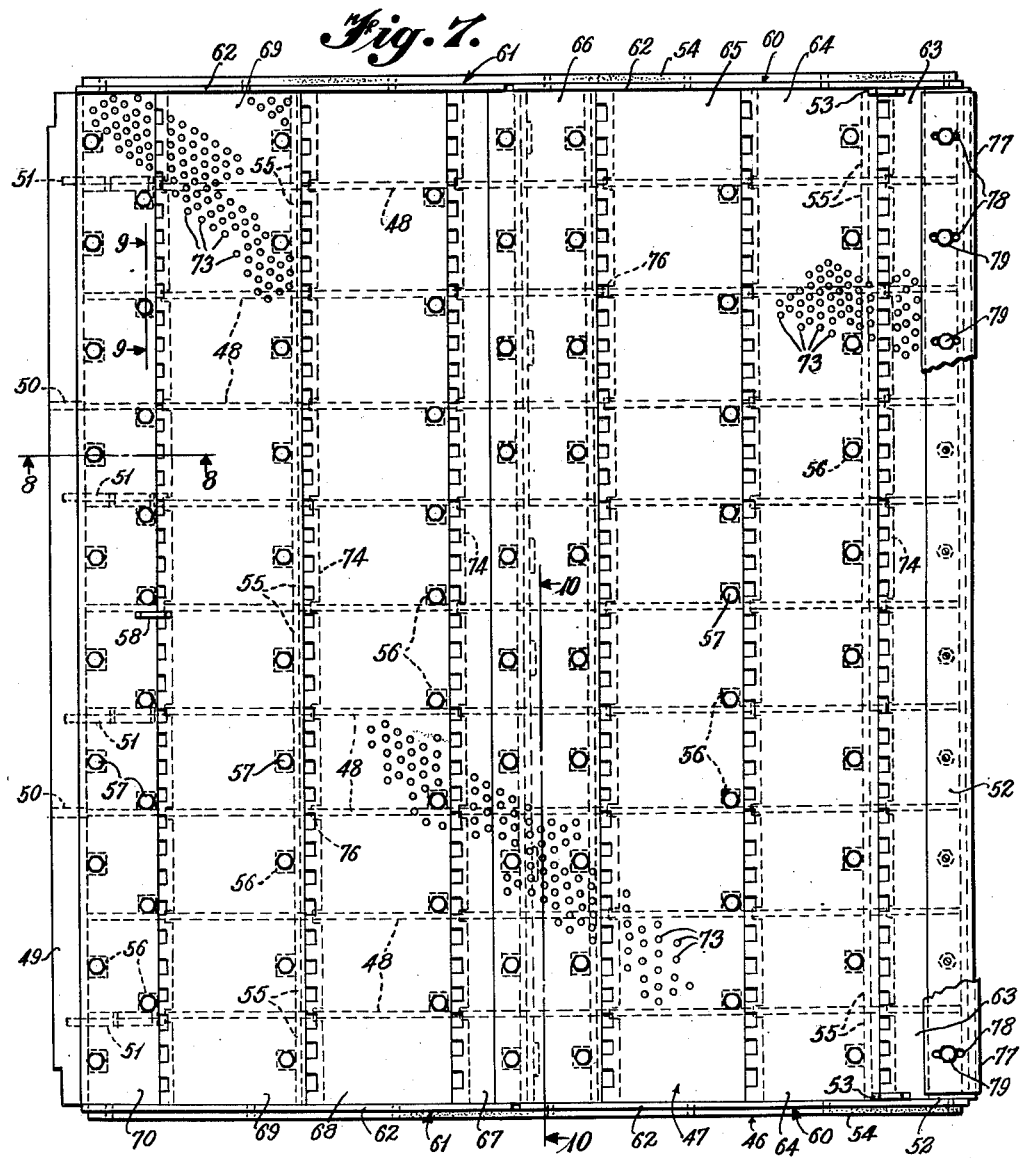
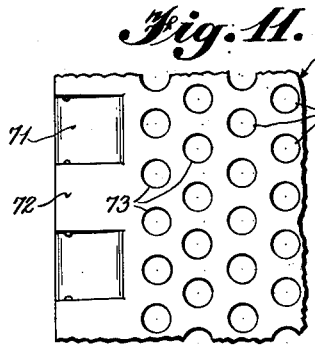
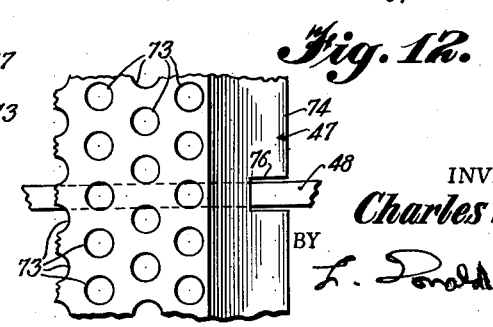
INVENTOR.
Charles W. Lotz
BY
ATTORNEY

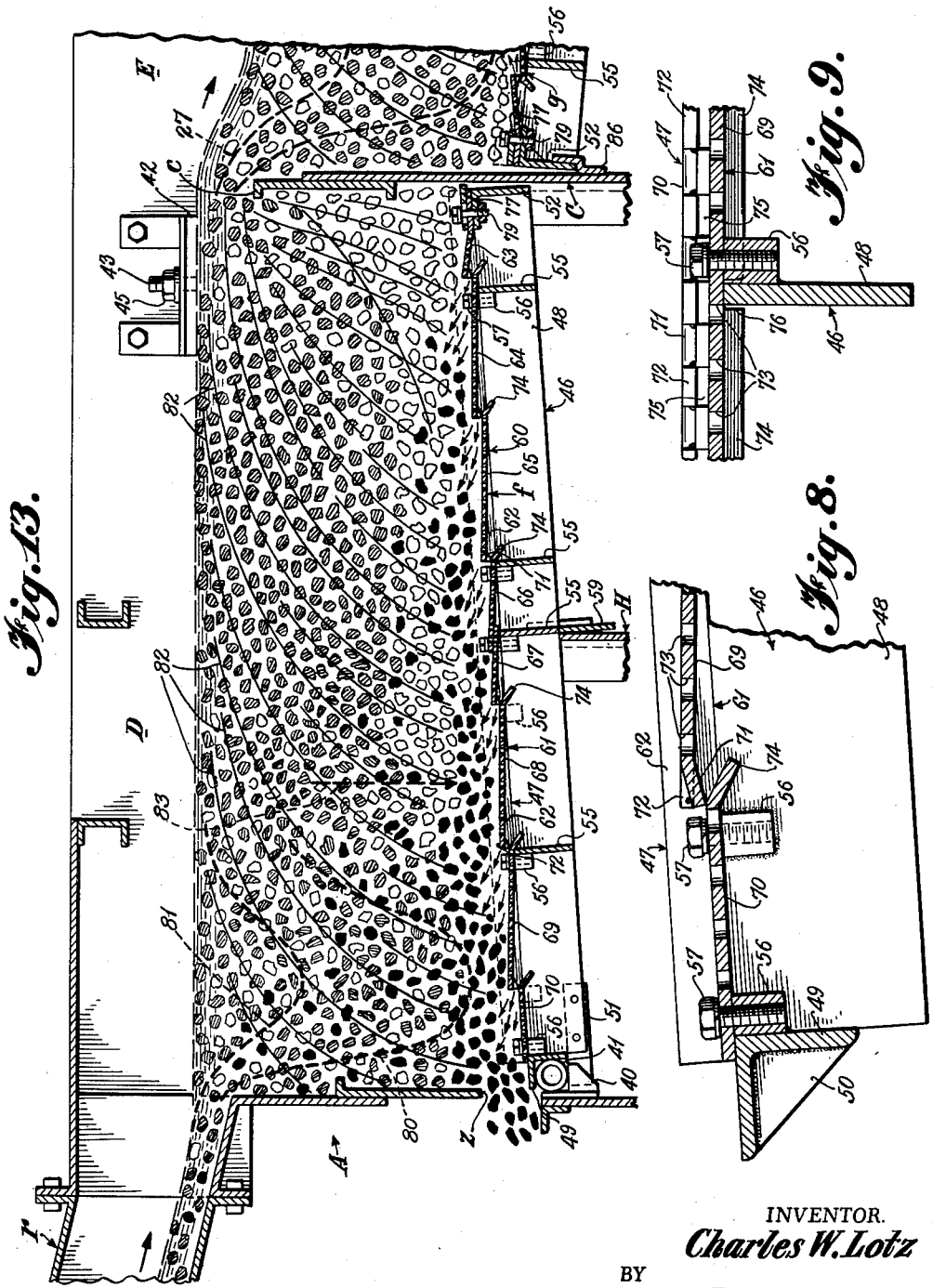

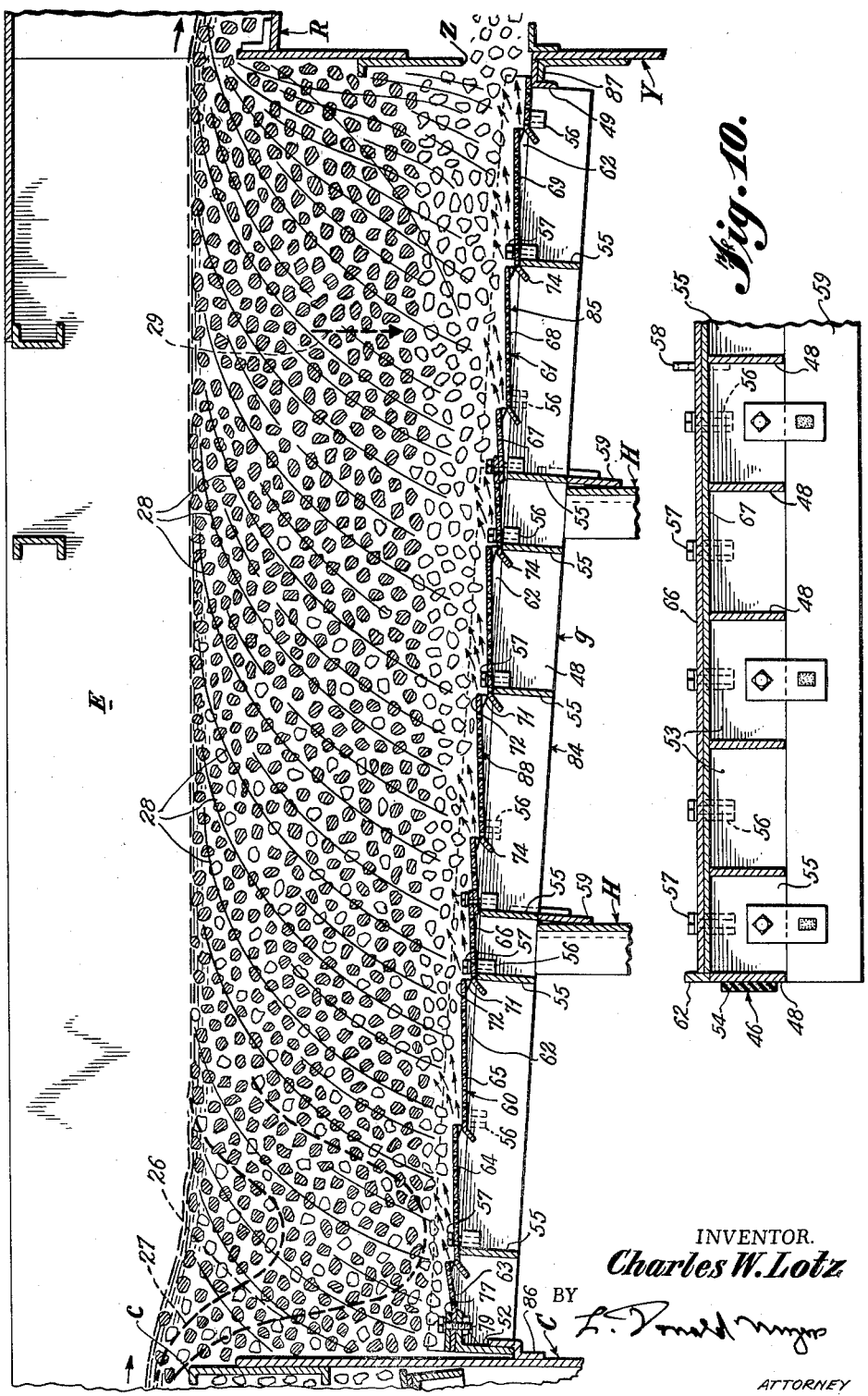

Patented Sept. 2, 1952

2,609,098

UNITED STATES PATENT OFFICE 2,609,098

METHOD OF AND APPARATUS FOR CONTINUOUSLY CLEANING AND SEPARATING MINERALS OF DIFFERENT SETTLING RATES

Charles W. Lotz, Chicago, Ill., assignor to Link-Belt Company, a corporation of Illinois Application March 7, 1950, Serial No. 148,213

23 Claims. (Cl. 209—457)

This invention relates to new and useful improvements in a method of and apparatus for continuously cleaning and separating minerals of different settling rates and deals more specifically with the type of apparatus that is referred to in the industry as a washing jig.

This application is a continuation-in-part of my copending application, Serial No. 753,524, filed June 9, 1947, for Method of and Apparatus for Continuously Cleaning and Separating Minerals of Different Specific Gravities.

For a very substantial length of time minerals, such as coal, ore, and the like, have been cleaned and separated into different end products by means of washing jigs which operate on the principle of effecting stratification of the minerals of lower and higher settling rates by subjecting a bed of the minerals, while supported on a screen surface, to the pulsion and suction strokes of a pulsating body of water.

During each pulsion stroke the water is caused to pass upwardly through the apertures of the screen surface and between the mineral particles of the bed to lift the bed off of the screen. Due to the different settling rates of the particles, those which are of higher settling rate do not rise as far as the particles of lower settling rate. During each suction stroke the water passes downwardly through the bed and the screen and the mineral particles are permitted to settle in accordance with their respective settling rates.

Repetition of these pulsation cycles of the body of water, which may occur at a speed of 25 to 55 cycles per minute, soon effects a complete stratification of the mineral particles with those having the highest settling rate being arranged in a layer at the bottom of the bed while the particles of lower settling rates are arranged in additional layers thereabove.

This principle of cleaning and separating minerals can be carried out either as a batch operation or as a continuous operation.

When a batch operation is employed, a desired amount of the mixed mineral particles is placed in a wash box by any suitable means and remains therein until the particles of different settling rates are stratified. With this type of operation the bed, for all practical purposes, is perfectly stratified with the highest settling rate material on the bottom and the lowest settling rate material on the top. Consequently, a completely satisfactory two-product separation can be effected by slicing the bed at the layer of any desired level and separately removing the upper and lower portions of the bed.

When a continuous operation is used, it is the present practice to employ a wash box that may be divided into a feed end compartment and an exit end compartment. The mixed starting material is sluiced into the wash box at the outer end of the feed end compartment. The final product, or lowest settling rate particles, are sluiced from the top of the wash box at the outer end of the exit end compartment. A horizontal hydraulic flow is produced throughout the entire length of the wash box as a result of the spilling of water from the feed end compartment into the exit end compartment and by the discharge of water from the outer end of the exit end compartment. This flow has been relied upon to effect the desired horizontal advancement of the material through the wash box.

As the starting material is sluiced into the feed end of the wash box the particles of refuse having the highest settling rate promptly settle to the surface of the material bed supporting screen and are discharged through the feed refuse draw at the feed end of the wash box. During its travel through the wash box the material is stratified as to settling rates by the action of the pulsating hutch water. The high settling rate particles that more slowly settle and collect at the bottom of the feed end compartment are intended to be discharged through an intermediate refuse draw which is located as close as possible to the upstream side of the division plate which defines the exit end of this compartment. The high settling rate particles that settle and collect at the bottom of the exit end are discharged through the exit refuse draw for this compartment.

One difficulty that has been experienced with the above apparatus is that while a two-product separation is obtained at the exit end of the wash box, for every-day operation it is not practical to effect a separation, of coal for example, at a specific gravity much below 1.50.

Careful observation of the operations of numerous continuous washing jigs has established the fact that this type of machine cannot be practically operated for coal at lower gravities because the hydraulic flow, which takes place horizontally through the exit end compartment of the wash box, is not capable of advancing the higher settling rate particles at the same velocity as the lower settling rate particles. This defect in the continuous operation of washing jigs will be explained more in detail as follows:

It has been pointed out above that during each pulsion stroke of the hutch water, the mineral particles forming the bed are lifted off of the supporting screen surface. The particles having a higher settling rate do not rise as far as the particles of lower settling rate, and the stratum formed by the first mentioned particles is more dense; that is, the higher settling rate particles remain closer together. The hutch water rising through the bed gradually changes its movement from a vertical direction to a horizontal direction under the influence of the hydraulic flow that occurs toward the exit end of the box. Since the lower settling rate particles in the upper portion of the bed are farther apart than the higher settling rate particles in the lower portion of the bed, the hydraulic resistance to flow of the lower settling rate particles is less and, therefore, their velocity of movement toward the exit end of the wash box is greater. Also, the lower settling rate particles in the upper portion of the bed are more easily moved than the higher settling rate particles in the lower portion of the bed.

As a result of these two factors, the velocity of horizontal movement of the bed varies throughout its depth, or gradually increases from the bottom to the top. Consequently, although the jigging action to which the bed is subjected attempts to produce perfect stratification, the differences in the velocity of horizontal travel of the particles toward the exit end of the wash box partly destroys the stratification by dragging and rolling the lower settling rate particles of the top layer over the higher settling rate particles of the lower layer, which brings about a mixing of the different particles so that at the exit end of the box there exists a mixed stratum which, if included with the lower settling rate particles of the upper strata, make it impossible to skim off a product having a gravity below 1.50 when cleaning and separating coal.

It, therefore, is one of the primary objects of this invention to provide an improved jigging method of and apparatus for continuously cleaning and separating mineral particles of different settling rates, whereby a completely satisfactory final two-product separation can be obtained at as low a settling rate as is desired, in keeping with the range of gravities and particle sizes and shapes present in the starting mixture.

A further important object of the invention is the provision of an improved method of and apparatus for moving a mineral bed horizontally through a compartment of a washing jig without interfering with or defeating the action of the pulsating water to produce perfect stratification of the particles forming the bed into layers of different settling rates or gravities with the highest settling rate particles at the bottom and the lowest settling rate particles at the top.

Still another object of the invention is to provide an improved method of and apparatus for introducing in a generally horizontal direction a portion of the hutch water into the bed of mineral particles located in the exit end compartment during the pulsion stroke of each cycle so as to cause the stratified higher settling rate particles to travel through said compartment at the same horizontal velocity and in the same direction as the lower settling rate particles.

When cleaning coal, another difficulty has been that when the starting mixture contains relatively large lenses of pyrite, which are commonly called "sulphur balls," these particularly high gravity particles drop downwardly through the bed in the feed end compartment in a matter of a few pulsations and remain static on the supporting screen. These sulphur balls eventually accommodate to such an extent that they bridge over and block the entrance to the feed refuse draw. When this occurs, an attendant must manually poke this refuse into the draw by means of a long rod or pole. On occasions the sulphur balls accumulate so rapidly that an attendant must work almost continuously in an attempt to keep clear the entrance to the refuse draw.

It is a further primary object of the invention to provide a method of and apparatus for continuously moving toward and discharging into the feed refuse draw all of the high settling rate particles, including the sulphur balls, that stratify in the lower portion of the feed end compartment of a wash box.

Still another object of the invention is to provide an improved method of and apparatus for introducing in a generally horizontal direction a portion of the hutch water into the bed of mineral particles located in the feed end compartment during the pulsion stroke of each cycle so as to cause the stratified, higher settling rate particles to travel through said compartment counter-current to the direction of movement of the lower settling rate particles and the hydraulic flow that produces such movement of the lower settling rate particles.

A further object of the invention is to provide a method of and apparatus for disposing of all of the stratified, higher settling rate particles in the feed end compartment of a wash box through one refuse draw and thereby eliminate the need for the customary intermediate draw.

A generic object of the invention is the provision of a method of and apparatus for effecting stratification of the different settling rate particles of the material beds in the compartments of a wash box by the vertical flow of a portion of the hutch water through the bed and for effecting a forced advancement of the higher settling rate particles horizontally through the bottom portion of the material bed by the introduction of a portion of the hutch water in a definite horizontal direction during the pulsion stroke of each cycle.

Other objects and advantages of the invention will be apparent during the course of the following description.

In the accompanying drawings forming a part of this specification and in which like numerals are employed to designate like parts throughout the same, Figure 1 is a perspective view, partly broken away, of a washing jig having one embodiment of this invention incorporated therein, Figure 2 is an enlarged, partial plan view of the improved mineral particle bed supporting apparatus illustrated in Fig. 1, Figure 3 is a fragmentary side elevational view of the bed supporting structure disclosed in Fig. 2, Figure 4 is a fragmentary, vertical sectional view taken on line 4—4 of Fig. 3, Figure 5 is an enlarged longitudinal, vertical section taken through the exit end compartment of the washing jig shown in Fig. 1, Figure 6 is a vertical sectional view of a washing jig showing a modified embodiment of the invention, Figure 7 is an enlarged plan view of the mineral particle bed supporting apparatus illustrated in Fig. 6, Figure 8 is a fragmentary, vertical sectional view taken on line 8—8 of Fig. 7, Figure 9 is a fragmentary, vertical sectional view taken on line 9—9 of Fig. 7, Figure 10 is a fragmentary, vertical sectional view taken on line 10—10 of Fig. 7, Figure 11 is a fragmentary, plan view of a portion of the particle bed supporting apparatus illustrated in Fig. 7, Figure 12 is a fragmentary, plan view of a different portion of the particle bed supporting apparatus illustrated in Fig. 7, Figure 13 is an enlarged longitudinal, vertical section taken through the feed end compartment of the washing jig shown in Fig. 6, and Figure 14 is an enlarged longitudinal, vertical section taken through the exit compartment of the washing jig shown in Fig. 6.

In the drawings, wherein for the purpose of illustration are shown the preferred embodiments of this invention, and first particularly referring to Fig. 1, there is shown a commercial form of washing jig that includes a wash box A which has the upper portion of its interior divided into two main sections by a longitudinally extending partition B that has its lower longitudinal edge terminating at b. The two main longitudinal sections formed in the wash box are each divided into two compartments by a division plate C which extends transversely of the wash box. Fig. 1 discloses in detail one longitudinal main section of the interior of the wash box which is divided into the feed end compartment D and the exit end compartment E by the division plate C.

The feed end compartment D is provided with a material bed supporting screen structure that is identified by the reference character F. The exit end compartment E of the wash box is provided with a material bed supporting screen structure G. In this disclosure, the screen structure G for the exit end compartment has been modified to incorporate an embodiment of this invention.

To continue with the brief description of the elements which are conventional in the illustrated commercial form of washing jig, the lower portion of the exit compartment E is shown as being divided into two cells by the transverse plate H. Although this exit compartment E is illustrated as being divided into only two cells below the screen structure G, it is to be understood that a large number of cells may be provided merely by employing additional plates H. The feed compartment D may be divided into any desired number of cells by the use of plates H.

The rear main section of the wash box A is illustrated as being closed at its top by means of the cover or wall J. It is to be understood that the division plate C and the cell forming plates H extend vertically through the rear main section of the wash box to form in this section extensions of the compartment cells that are illustrated in Fig. 1.

The wash box A, when the jig is operating, is provided with water up to a desired level. To effect stratification of the beds of mineral particles that are present in the feed compartment D and the exit compartment E, which beds are supported by the screen structures F and G, the body of water in the wash box A is caused to pulsate through the respective cells by the timed admission of compressed air into the upper portions of the cells in the rear main section of the wash box. That is compressed air is employed as the pulsating medium and a sufficient quantity of air is admitted to the rear part of each cell, above the water level, to cause the water to rise as a pulsion stroke through the perforations of its associated screen structure and the bed of mineral particles supported by the latter. Each pulsion stroke is followed by a suction stroke, resulting from exhausting the air from above the water in the rear portions of the cells, during which suction strokes the water passes downwardly through the bed of mineral particles and the perforations of the supporting screen structures.

Air admitting and exhausting valves K are provided for the several cells. These valves are operated in proper timed relation by the cams L that are fastened on the cam shaft M. All of the valves K for the cells of either one of the compartments are opened and closed simultaneously, but the valves K for the two compartments are oppositely operated; i. e., the valves of one compartment are opened to produce a pulsion stroke of the water while the valves of the other compartment are closed, or function to exhaust the air, to bring about a suction stroke with reference to the water in that compartment. The valves K are connected in the respective air inlet pipe lines N which communicate with the air receiver O. Compressed air from a suitable source of supply is delivered to this receiver O.

The starting mixture of mineral particles of different settling rates is introduced into the receiving end of the wash box compartment D by the sluice r. While in this feed compartment D, the highest settling rate particles of the starting mixture are almost immediately drawn off through the feed refuse or primary draw q and fines which will pass through the apertures of the supporting screen structure F will settle through the cells into the bottom of the compartment for removal by a screw conveyor t, that is housed in the trough P, and the bucket elevator s. The remaining mineral particles will be advanced lengthwise of the compartment D and during each pulsion stroke in this compartment a stream of the particles and water will spill over the upper edge c of the division plate C which extends above the levels of the screen structures F and G to act as a weir. Although stratification of the mineral particles occurs in the feed compartment D, it is destroyed as the particles spill over the weir edge c of the division plate C. Consequently, the mineral particles of different settling rates are thoroughly mixed when they are delivered to the receiving end of the exit compartment E.

While advancing through the exit compartment E, the mineral particles of different settling rates are stratified so that the higher settling rate particles can be withdrawn from the compartment by the exit refuse draw Q which discharges them into the bucket elevator S. The lower settling rate particles spill out into the exit sluice R with a certain amount of water during each pulsion stroke that occurs in the exit compartment E. Any lines that pass through the apertures of the screen structure G will settle through the cells of this compartment and will be carried to the bucket elevator S by the screw conveyor T which is housed in the trough V.

The feed and exit refuse draws q and Q do not operate continuously. Their periods of operation are controlled by the automatic devices W that are actuated by the floats X. Each of these floats X functions in response to the level of the stratum of higher settling rate particles that passes the float. In other words, when either stratum of higher settling rate particles reaches a certain level, the associated float X will be raised to actuate the automatic control mechanism W and the refuse draw q or Q then will operate. The refuse draw will continue to operate until the level of the stratum of higher settling rate particles drops and permits the float X to drop correspondingly.

Due to the withdrawal of water from the discharge end of the exit compartment E, along with the withdrawn particles that form the two end products, a hydraulic flow takes place in the exit compartment E. Normally, this hydraulic flow is relied upon to move the mineral bed through the exit compartment. With the standard form of screen structure F employed in the exit compartment E, in place of the improved form of screen structure G, it has been pointed out above that the mineral particles will not be stratified in the exit compartment so that the lighter gravity end products will have a specific gravity much below 1.50 when coal is being cleaned.

The construction of one improved form of screen structure G now will be described in detail in connection with the disclosures provided by Figs. 2 to 5, inclusive, of the drawings.

Fig. 5 discloses the exit compartment E which is defined at its receiving end by the division plate C and at its removal end by the end wall Y of the wash box. This compartment is divided into two cells below the screen structure G by the transverse plate H.

Two side channels 6 extend lengthwise of the exit compartment E and are suitably secured to the partition B and the opposed side wall of the wash box A. The ends of these side channels adjacent the outer end wall Y of the wash box are bent downwardly at 7. A suitable number of transversely extending bars 8 are provided to extend between the side channels 6. The opposite ends of these transverse bars 8 have welded thereto sleeves 9 which receive the pins 10 that pass through suitable openings formed in the edge flanges 11 of the side channels 6. The ends of the transverse bars 8, as more particularly illustrated in Fig. 4, are properly shaped to enter the spaces formed between the edge flanges 11 of the side channels 6. The construction just described, therefore, functions to suitably connect the opposite ends of the transverse bars 8 to the side channels 6.

At suitably spaced points throughout the lengths of the transverse bars 8, special nuts 12 are secured in any suitable way, such as by welding. These nuts 12 are intended to receive the threaded ends of the cap screws 13 that are employed for fastening in place the improved screen structure G. As will be explained more in detail at a later point, this improved screen structure is of stepped formation and for that reason the cap screws 13 pass through spacer sleeves 14 which vary in length longitudinally of the screen structure G.

The screen structure is made up of a plurality of transversely extending plates which are identified by the reference numerals 15 to 20, inclusive. The plate section 15 is positioned at the receiving end of the exit compartment E and bears against the face of the division plate C along one longitudinal edge. This plate section 15 is approximately twice as long—the dimension lengthwise of the compartment E—as the screen plate sections 16, 17, 18 or 19. The reason for this greater length will be brought out at a later point. This plate section 15 occupies the highest level or plane of all of the screen plate sections and is supported in a horizontal plane so as to provide a flat top surface. This plate is provided with a multiplicity of apertures 21 which are directed truly vertically.

Each one of the screen plate sections 16 to 19, inclusive, is of identical construction. It has a flat main body portion which is supported in a horizontal plane and is provided with a multiplicity of apertures 21 which are directed truly vertically. The leading edge portion 22 of each one of these screen plate sections 16 to 19, inclusive, is inclined downwardly, as is clearly illustrated in Figs. 3, 4 and 5. Plate section 16 is located on a lower level than plate section 15 and the same arrangement is established for plate sections 17, 18 and 19. The inclined edge portion 22 of each one of these plates underlies, in lapped relation, the adjacent edge portion of the next higher level screen plate section. It will be seen, therefore, that a transverse gap is provided between the overlapped edge portions of each adjacent pair of screen plate sections 15 to 19, inclusive.

Plate section 20 has its main body portion formed into two angularly related parts so as to blend in with the next adjacent plate section 19 and so as to provide an incline that leads to the opening Z associated with the removal draw Q. The leading edge 23 of this screen plate section 20 is inclined like the edge portions 22 of screen plates 16 to 19, inclusive, and underlies the adjacent edge portion of the plate section 19. This screen plate section 20, also, is provided with apertures 21 in its two main angularly arranged portions and these apertures have their axes arranged at right angles to the faces of the portions of the plate in which they are formed.

It has been pointed out above that the plates 15 to 19, inclusive, and the adjacent horizontally arranged portion of the plate 20 are positioned in stepped relation with respect to each other and that a gap is provided between the trailing longitudinal edge of each one of these plate sections and the inclined leading edge portion of the next adjacent plate section. Each one of these gaps, therefore, is provided with an entering throat that is formed by the associated inclined edge 22 or 23.

These gaps are employed for introducing a desired amount of the hutch water in a substantially horizontal direction into the portion of the mineral particle bed that is overlying the top of the plate section that is located immediately downstream of each gap. This substantially horizontally directed water is employed for assisting in advancing the higher settling rate particles toward the removal opening Z formed in the end plate Y of the wash box. To restrict this substantially horizontally directed water to the proper amount or volume to accomplish the desired result, the total area of each one of these gaps is reduced by securing the filler members 24 therein. These filler members are welded to the associated portions of the adjacent plates that form the gaps.

It has been determined that a proper amount of horizontally directed water will be provided if the filler members 24 close off substantially 50 per cent of the total area of each gap. These filler members are equally spaced throughout the length of each gap and, therefore, provide openings 25 from which jets of water will be directed into the bottom portion of the mineral particle bed.

Fig. 5 discloses the bed of mineral particles in the exit compartment E. This bed is made up of particles that are shaded to represent the lower settling rate particles and particles that are unshaded to illustrate those of higher settling rates.

As has been pointed out above, during each pulsion stroke in the feed compartment D, some of the particles that have been stratified therein spill over the weir edge c of the division plate C into the exit compartment E with some of the water that is in the feed compartment D. This spilled mixture of different settling rate particles and water substantially follows the path that is defined by the dash lines 26 and 27 in Fig. 5. By considering the shaded and unshaded particles in this receiving end of the exit compartment E, it will be seen that the higher settling rate particles and lower settling rate particles are thoroughly mixed.

This mixture of different settling rate particles at the receiving end of the exit compartment E immediately is subjected to the pulsion and suction strokes of the hutch water that moves upwardly and downwardly through this end portion of the bed and the apertures 21 formed in the screen plate section 15. These pulsion and suction strokes of the water start immediately to effect stratification of the higher and lower settling rate particles. That is to say, the higher settling rate particles start accumulating in the lower portion of the bed while the lower settling rate particles start accumulating in the upper portion of the bed. A definite stratum of higher settling rate particles is formed by the time the particles reach the downstream or trailing edge of the first screen plate section 15.

The hydraulic flow of water lengthwise of the exit compartment E results from the introduction of water into this compartment over the weir edge c of the division plate C and through the apertures of the screen plate sections and by the withdrawal of water with both the lower settling rate end product and the higher settling rate end product. The water that is introduced into the bed through the perforations 21 of the several screen plate sections travels in a vertical direction as it leaves the plate apertures. Its direction of movement, however, gradually changes until it assumes a horizontal direction as a result of the hydraulic flow longitudinally of the exit compartment. The curved solid lines 28 of Fig. 5 are intended to illustrate this change in direction of movement, from vertical to horizontal, of the introduced hutch water that passes through the plate apertures 21.

If the hydraulic flow longitudinally of the exit bed E is the only medium employed for effecting advancement of the bed through the compartment, it has been determined that the higher settling rate particles accumulated in a stratum at the lower portion of the bed will not advance at the same velocity as the lower settling rate particles accumulated in the upper portion of the bed. This is due to the fact that the higher settling rate particles offer more resistance to the hydraulic flow than do the lower settling rate particles. Because of this difference in velocity of movement of the higher and lower settling rate particles, the upper stratum of lower settling rate particles is dragged over the lower stratum of higher settling rate particles. This differential movement results in stirring and mixing the particles of different settling rates. It is impractical, therefore, to withdraw an end product that has a specific gravity much below 1.50 when cleaning coal.

To overcome this inefficiency that results from the difference in the velocity of advancement of the stratum of lower settling rate particles and the stratum of higher settling rate particles, hutch water is introduced into the bed through the openings 25 that are provided between the adjacent, overlapped edge portions of the various screen plate sections. By considering the arrow lines, which are employed for illustrating this introduction of hutch water during each pulsion stroke, it will be seen that these streams of water are directed substantially horizontally and are limited in their horizontal propulsion action to the depth of the higher settling rate stratum that is formed at the bottom portion of the bed. These horizontally directed jets of water, therefore, assist or supplement the action of the hydraulic flow through the compartment E to advance the higher settling rate particles. When the proper amount of hutch water is introduced into the bottom portion of the bed by these horizontally directed streams, the stratum of higher settling rate particles will advance through the bed at the same velocity as the stratum of lower settling rate particles.

Although I do not desire to be limited to the following proportions or dimensions, it has been determined that for cleaning and separating coal in an exit compartment that is six feet wide, the proper amount of water will be introduced in the bottom portion of the bed, in the form of substantially horizontally directed jets, if the gap provided between each adjacent pair of screen plate sections is so constructed that the total area of all of its openings 25 is approximately 9 square inches. This total opening area can be provided if the six foot long gap measures one quarter of an inch in height or depth and has fifty per cent of its total area closed off by thirty-six of the filler members 24 which are each one inch in length. It will be appreciated that the total area provided by the openings 25 will have to be varied to take care of different kinds and characters of minerals that are to be cleaned and separated in the washing jig.

Let us now consider the action that takes place at the removal end of the compartment E.

It has been pointed out above that the float X and the automatic control mechanism W that is actuated by the float determine the periods of operation of the exit refuse draw Q. In other words, this draw starts operating when the stratum of higher settling rate particles reaches a certain maximum depth and stops operating when the depth of the higher settling rate particle stratum is reduced to a certain minimum. The float X is located so as to measure the depth of the higher settling rate stratum at approximately the point indicated by the vertical broken arrow line 29. It will be appreciated, therefore, that the timing of the operation of the exit refuse draw Q determines the depth of the higher settling rate stratum that is maintained at the removal end of the bed.

The depth of the stratum of higher settling rate particles that must be maintained at the removal end of the bed is governed by the rate of horizontal advancement of this stratum. If the rate of this advancement is too low then the top of this stratum must be maintained at a higher level above the inclined main body portion of the screen plate section 20. For example, if the conventional, horizontal hydraulic flow is solely relied upon to effect longitudinal advancement of the higher settling rate particles, with the result that the stratum of these particles lags behind the upper stratum of lower settling rate particles, the top of the stratum of higher settling rate particels must be maintained approximately at the level indicated by the broken line 30. Otherwise, when the draw Q begins to operate, it quickly removes a small amount of the higher settling rate particles which are immediately over the opening Z and some of the lower settling rate particels are then removed through the opening Z with the result that the higher settling rate end product is contaminated.

The reason for this unsatisfactory mode of operation can be explained by pointing out that the operation of the draw Q depends entirely upon the location or level of the top of the higher settling rate stratum at the float X. When the draw Q begins to operate, it first brings about lowering of the top of the higher settling rate stratum from the level of line 30 until there is a difference in elevation between the top of this stratum at the end of the compartment E and at the location of the float. Then the higher settling rate particles begin to flow toward the draw Q. However, the level of the top of this stratum at the location of the float X may not fall fast enough to cause the float to stop the operation of the draw in time because of the sluggishly moving heavier material. Consequently, it requires a nice operating balance between the speed of removal by the draw, the float depth and the location of the top of the higher settling rate stratum, or line 30, to obtain the desired results.

When the higher settling rate stratum is assisted in advancing through the compartment E by the horizontally directed streams of water produced by the construction of the screen structure G, the above referred to conditions do not exist. As soon as the draw Q begins to remove the material of the higher settling rate stratum it is replaced by material that is advanced horizontally, particularly from under the float X. Consequently, because the removed material is replaced by horizontally advanced material instead of by material that must drop down from above, the top of the stratum of higher settling rate material does not have to be maintained so high, such as up to the line 30.

By carefully examining the character of the removal end portion of the bed illustrated in Fig. 5, it will be seen that the top of the stratum of higher settling rate particles remains at the level that has been established over the screen plate sections 18 and 19. This lower level for the top of the higher settling rate stratum at the removal end of the bed has been found to be entirely satisfactory when the stratum of higher settling rate particles is caused to advance at the same velocity as the stratum of lower settling rate particles by the horizontally introduced streams of water that are produced at the locations of the several transverse series of openings 25. Expressed in another way, the stratification is so nearly perfect, as a result of the use of the horizontally directed streams of water, that it is possible to remove two end products that are not contaminated and with the end product of lower settling rate having a specific gravity as low as 1.40, for example.

Referring now to the embodiment of the invention shown in Figs. 6 through 14. Fig. 6 illustrates a washing jig of the general type which has been described in detail in connection with Figs. 1 to 5, inclusive. The conventional elements of the washing jig of Fig. 6 have been given the same reference characters as those used on the corresponding elements in Fig. 1 and the description of these elements will not be repeated at this time.

In this embodiment of the invention a modified, or improved, material bed supporting screen structure is used in the feed end compartment as well as in the exit end compartment. These two screen structures $f$ and $g$ are of substantially the same construction, differing principally only in size.

Although the construction of screen $g$ differs in detail from, and is an improvement over, the construction of screen G, used in the exit end compartment E of the washing jig shown in Figs. 1 to 5, inclusive, both screens will carry out the same method in exactly the same manner. It will not be necessary, therefore, to repeat the description of this method for the exit end compartment E of the washing jig shown in Figs. 6 to 14, inclusive.

The use of the modified screen $f$ in the feed end compartment of the washing jig shown in Figs. 6 to 14, inclusive, results in the carrying out of an entirely different method than that performed in the feed end compartment of the washing jig shown in Figs. 1 to 5, inclusive. When washing coal, use of the screen $f$ effects the complete removal of all of the lenses of pyrite, or sulphur balls, from the feed end compartment D through the refuse draw $q$, and eliminates the need for an intermediate refuse draw, not shown, which conventionally would be located just upstream of the division plate C.

The embodiment of the invention shown in Figs. 6 to 14, inclusive, for the above reasons, will be described in detail only with reference to the specific construction of the improved screens $f$ and $g$ and the method performed by the screen $f$ in the feed end compartment D.

The construction of the improved screen $f$, illustrated in Figs. 6 through 13, first will be described in detail.

Fig. 13 specifically discloses the feed end compartment D which is separated from the exit compartment E by the division plate C. This compartment D is divided into two cells below the screen structure $f$ by the transverse plate H and is provided with an opening $z$ into the refuse draw $q$.

Considering Figs. 6 and 13, a bracket 40 is mounted on the feed end wall of the wash box A beneath the opening $z$ for supporting the cylindrical screen bearings 41. The function of these bearings 41 in supporting the screen $f$ will be described hereafter. A pair of screen supporting lugs 42 are mounted on the opposite side walls of the compartment D adjacent the division plate C and above the material bed. Each of the lugs 42 is provided with a depending rod 43 having a strap 44 fastened to its lower end portion for connection with the screen $f$. The rods 43 are threaded for adjustable connection to the lugs 42 by the nuts 45 so that the distance the rods depend may be varied.

As illustrated in Figs. 6 through 13, the screen structure is made up of a frame 46 and a screening surface or plate 47. The frame 46 is formed by a plurality of bars 48 which extend lengthwise of the compartment D and are uniformly spaced across the entire width of the compartment. The end portions of the bars 48, adjacent the draw opening $z$, are connected by the angle iron 49 which rests upon the screen bearings 41. A pair of triangular braces 50 are welded into the included angle of the angle iron 49 between adjacent bearings 41. Certain of the bars 48 are provided with plates 51 which are connected to the end portions of the bars and extend outwardly directly beneath the angle iron 49 and the bearings 41 to hold this end of the frame 46 from lifting during the pulsion strokes.

The opposite end portions of the bars 48 are welded to the angle iron 52 which extends across the ends of and is flanged inwardly over the tops of the bars. A pair of lugs 53 are mounted on the bars 48 on opposite sides of the frame 46 adjacent the angle iron 52. These lugs 53 are pivotally connected to the straps 44 so that vertical adjustment of the rods 43 will cause pivotal movement of the frame 46 about the bearings 41. In this manner, the frame may be caused to slope downwardly toward the draw opening z by varying amounts of inclination.

The outside bars 48 of the screen frame 46 are provided with rubber strips 54, or the like, which are suitably connected to the outer surfaces of the bars and bear against the side walls of the wash box A to provide seals.

A plurality of spacer plates 55 are welded, or otherwise suitably connected, between adjacent pairs of bars 48 in lateral alinement and spaced longitudinally of the frame 46 intermediate its ends. At approximately the mid-point between each pair of adjacent bars 48, the angle iron 49, the angle iron 52 and each one of the spacer plates 55 is provided with a special nut 56 which is attached in any suitable way, such as by welding. The bars 48 also are provided with additional special nuts 56 at spaced locations along their lengths. These nuts 56 are intended to receive the threaded ends of the cap screws 57 that are employed for fastening the improved screening surface or plate 47 to the frame 46, as will be explained in greater detail at a later point.

A lug 58 is attached to the center bar 48 at the end of the frame 46 that is adjacent the refuse opening z to facilitate handling and installing the frame.

The divider plate 59 is connected to the spacer plates 55 and extends downwardly across the approximate mid-point of the screen to contact the transverse plate H. This divider plate 59, therefore, prevents open communication between the cells of the feed end compartment D despite limited pivotal movement of the frame 46.

The screening surface or plate 47 is made up of an upper section 60, located adjacent the division plate C, and a lower section 61, located adjacent the draw opening z. Each of the sections 60 and 61 consists of a pair of side bars 62 and a plurality of transversely extending perforated plates that are overlapped at their adjacent edge portions. These plates of the two sections are identified by the reference numerals 63 to 70, inclusive. The perforated plates 63 to 66 are each welded, or otherwise suitably connected, at their end portions to one pair of side bars 62 to form the upper section 60 and plates 67 to 70 are similarly connected to the second pair of side bars 62 to form the lower section 61.

Considering the transverse edge portions of the perforated plates that are located closest to the draw opening z as the trailing edges and the opposite transverse edge portions as the leading edges, the upper section 60 of the screen plate 47 will now be described.

The plate 63 is slightly bent along a longitudinal line so that its leading portion is parallel and its trailing portion is inclined upwardly with respect to the side bars 62. At spaced locations across its trailing edge, the plate 63 is cut inwardly to provide a plurality of adjacent fingers. Alternate ones of the fingers are bent on a line along the inner ends of the cuts to incline downwardly and form the filler members 71. The other fingers remain in their original positions and form director members 72. The upwardly inclined portion of the plate 63 is provided with a multiplicity of apertures 73 which are perpendicular to the surface of the plate.

The perforated plate 64 has a flat main body portion which is inclined upwardly toward its trailing edge and is provided with a multiplicity of apertures 73. The leading edge portion 74 of plate 64 is bent to incline downwardly as is clearly illustrated in Figs. 6, 8, 9, 12 and 13. The inclined edge portion 74 lies beneath the adjacent trailing edge of the plate 63 so that the filler members 71 are in contact with the plate 64 along the bend line of the inclined edge portion. It will be seen, therefore, that a plurality of apertures 75 are provided between the overlapped edge portions of plates 63 and 64. The trailing edge of plate 64 is provided with filler and director members 71 and 72, respectively, identical to those of plate 63.

Perforated plate 65 is identical in construction to plate 64 and its leading edge portion 74 is associated with the trailing edge of plate 64 in the same manner as the overlapped edges of plates 63 and 64.

Plate 66 is provided with the same leading edge 74 as plates 64 and 65 and is associated in the same way with the overlapped trailing edge of plate 65. The trailing edge of plate 66, however, is a straight continuation of the inclined body of the plate to a point slightly beyond the end portions of the side bars 62. The multiplicity of apertures 73 in the plate 66 are of the type previously discussed.

The lower section 61 of the screen plate 47 is of similar construction to the upper section 60 with the exception of the leading edge of the perforated plate 67 and the trailing edge of the perforated plate 70. The leading edge of the plate 67 is arranged to flatly overlap the trailing edge of plate 66. Plate 70 is mounted with its body portion in parallel relationship with the side bars 62 and its trailing edge terminating in alinement with the ends of the side bars.

The leading edge 74 of each of the perforated plates 64, 65, 66, 68, 69 and 70 is provided with notches 76 to receive the bars 48. The upper section 60 and the lower section 61 of the screening surface or plate 47 are positioned on the screen frame 46 with the side bars 62 resting on the tops of the bars 48 on opposite sides of the frame. Openings are provided in the screening surface or plate 47 for the lugs 53 and 58 and for the cap screws 57. These cap screws pass through the various perforated plates, as illustrated in Fig. 7, for rigidly connecting them to the frame 46.

Figs. 7 and 13 disclose an adjustable plate 77, having slotted openings 78 spaced along its length, which is positioned on the leading edge of the perforated plate 63 and bolts 79 connect the plates 77 and 63 to the angle member 52. The plate 77 may be adjusted laterally to close the space between the end of the screening surface or plate 47 and the division plate C.

It has been pointed out above that the perforated plates 63 to 69 are inclined upwardly toward their trailing edges and that the frame 46 is inclined downwardly toward the draw opening z. This arrangement causes the plates 63 to 69 to form a stepped series of substantially horizontal material bed supporting surfaces with vertically directed apertures 73 therethrough. The plate 70 is parallel with the side bars 62 and, therefore, inclined downwardly toward the opening z.

The openings 75, formed between the filler and director members 71 and 72 and the leading edges 74, point in a substantially horizontal direction toward the opening z and are each provided with an entering throat that is formed by the associated edge 74. These openings 75 are employed for introducing a desired amount of hutch water as jets in a substantially horizontal direction into the portion of the material bed that overlies the perforated plates immediately downstream of each opening 75.

These substantially horizontally directed jets of water function in cooperation with the general inclination of the screening surface or plate 47 to positively advance the highest settling rate particles toward and into the opening z. It has been determined that a proper amount of horizontally directed water will be provided for this purpose if the filler members 71 are of the same width as and are equal in number to the openings 75.

Fig. 13 discloses the bed of mineral particles in the feed end compartment as consisting of three different types or settling rate groups. Those that are shaded represent the lowest settling rate or final float product that is removed from the top of the exit end compartment. Those that are unshaded represent the intermediate settling rate or final sink product that is removed by the exit end draw Q. Those that are of solid color represent the highest settling rate that are removed from the feed end compartment by the draw q. The horizontally directed jets of hutch water that result from the use of the screening surface or plate 47, therefore, function to move the solid colored particles toward and into the feed end draw q.

The starting mixture of mineral particles of different settling rates, with some water, is introduced into the feed end compartment D through the sluice r and substantially follows the path that is defined by the curved dash lines 80 and 81 in Fig. 13.

Immediately upon entering the compartment D, the starting mixture is subjected to the action of the pulsion and suction strokes of the hutch water and stratification of the different settling rate particles begins. In other words, the highest settling rate or solid colored particles will immediately start to settle to the bottom portion of the material bed while the intermediate settling rate or unshaded particles are forming an intermediate layer and the lowest settling rate or shaded particles are forming a top layer in the bed.

The hydraulic flow of water through the feed end compartment D results from the introduction of water into the compartment with the starting mixture and through the apertures 73 and the withdrawal of water over the weir edge c of the division plate C. The water that is introduced into the bed through the apertures 73 travels in a vertical direction as it leaves the screening surface or plate 47. Its direction of movement, however, gradually changes until it assumes a horizontal direction as a result of the hydraulic flow longitudinally of the compartment D. The curved solid lines 82 of Fig. 13 are intended to illustrate this change in direction of movement, from vertical to horizontal, of the introduced hutch water that passes through the apertures 73.

The intermediate and lowest settling rate particles will be advanced lengthwise of the compartment D by the hydraulic flow and during each pulsion stroke in this compartment a stream of these particles and water will spill over the upper edge c of the division plate C. While these intermediate and lowest settling rate particles are being advanced through the feed end compartment D to the division plate C, it is necessary that the highest settling rate particles in the bottom of the material bed be moved in the opposite direction toward the draw opening z.

To accomplish this desired movement of the highest settling rate particles, jets of hutch water are introduced into the bottom of the bed through the horizontally directed openings 75. By considering the arrow lines, which are employed for illustrating this introduction of hutch water during each pulsion stroke, it will be seen that these jets of water are limited in their horizontal propulsion action to the highest settling rate particle stratum that is formed at the bottom portion of the bed. These horizontally directed jets of water, therefore, propel the solid colored particles toward and into the opening z in counter-current relationship with reference to the movement of the remaining mineral particles.

The feed end compartment D is provided with an automatic control mechanism W that is actuated by the float X to determine the periods of operation of the feed end refuse draw q. In other words, the draw q starts operating when the stratum of highest settling rate particles reaches a certain maximum depth and stops operating when the stratum is reduced to a certain minimum depth. The float X in the feed end compartment D is located so as to measure the depth of the stratum of highest settling rate particles at approximately the point indicated by the vertical, broken arrow line 83 in Fig. 13. It will be appreciated, therefore, that the operation of the draw q determines the depth of the stratum of highest settling rate particles that is maintained over the draw opening z.

Considering now the screen structure g in the exit compartment E, as illustrated in Figs. 6 and 14, it is noted that the screen is made up of a frame 84 and a screening surface or plate 85. The frame 84 is of similar construction to frame 46 of the screen structure f in the feed end compartment D but is of greater length to accommodate the additional cell in the exit compartment E. Corresponding parts of the frame 84 have been given the same reference characters used in the description of frame 46. For that reason, a detail description of the frame 84 will not be given at this point.

The frame 84 is mounted in the compartment E so that the angle iron 52 rests in a bracket 86 on the division plate C and the angle iron 49 rests on a flange 87 at the bottom of the draw opening Z. The frame 84, therefore, is not adjustable like the frame 46 and is inclined downwardly toward the opening Z.

The screening surface or plate 85 is made up of an upper section 60 identical to the upper section 60 of the screen plate 47, a lower section 61 identical to the lower section 61 of the screen plate 47, and an intermediate section 88 of similar construction to the upper and lower sections but adapted to connect the latter two sections and form a continuous screen surface.

The intermediate settling rate, or unshaded, particles and the lowest settling rate, or shaded, particles, in a thoroughly mixed condition, are introduced into the exit compartment E with some hutch water during each pulsion stroke that occurs in the feed end compartment D. This intermixing of these previously stratified particles of different settling rates results from their passage over the upper edge c of the division plate C.

After entering the compartment E, the unshaded and shaded particles are restratified and separated in exactly the same manner as was previously described in connection with the screen structure G and the exit end compartment E of the embodiment of the invention disclosed in Figs. 1 to 5, inclusive. It should be understood that in considering the stratification that takes place in the exit end compartment E, the unshaded particles become the higher or highest settling rate particles while the shaded particles become the lower or lowest settling rate particles.

It is to be understood that I do not desire to be limited to the exact order of method steps as they have been disclosed, for variations and modifications of the same, which fall within the scope of the accompanying claims, are contemplated. It further is to be understood that the particular type of apparatus herein shown and described is to be taken as preferred examples of the invention, and that various changes in the shape, size, and arrangement of parts may be resorted to without departing from the spirit of the invention or the scope of the subjoined claims.

Having thus described the invention, I claim:

1. The method of separating mineral particles of lower settling rate from mineral particles of higher settling rate, comprising establishing a horizontally elongated bed of the particles to be separated, introducing water and a mixture of the different settling rate particles to one end of the bed, removing water from the opposite end of the bed to establish a hydraulic flow which will effect horizontal advancement of the particles toward the last mentioned end of the bed, separately removing from the last mentioned end of the bed the particles of lower settling rate and the particles of higher settling rate which have been stratified while advancing lengthwise of the bed, repeatedly subjecting the bed to cycles of vertically acting alternate pulsion and suction strokes of water to effect stratification of the particles in accordance with their respective settling rates, and during the vertically acting pulsion stroke of each cycle supplementing the horizontal particle advancing action of the aforesaid hydraulic flow by introducing a fluid into the bed in a plurality of jets substantially parallel to the bottom of said bed and spaced longitudinally over substantially the entire bottom of the bed, said jets being directed toward the removal end of said bed to assist in advancing toward the latter the particles having the higher resistance to said hydraulic flow.

2. The method of separating mineral particles of lower settling rate from mineral particles of higher settling rate, comprising establishing a horizontally elongated bed of the particles to be separated, introducing water and a mixture of the different settling rate particles to one end of the bed, removing water from the opposite end of the bed to establish a hydraulic flow which will effect horizontal advancement of the particles toward the last mentioned end of the bed, separately removing from the last mentioned end of the bed the particles of lower settling rate and the particles of higher settling rate which have been stratified while advancing lengthwise of the bed, repeatedly subjecting the bed to cycles of vertically acting alternate pulsion and suction strokes of water to effect stratification of the particles in the bed with the highest settling rate particles on the bottom and the lowest settling rate particles on the top, and during the pulsion stroke of each cycle supplementing the horizontal particle advancing action of the aforesaid hydraulic flow by introducing jets of water into and in substantially parallel relationship with the bottom portion of the bed at a plurality of longitudinally spaced locations extending over the entire stratified portion of the material to assist in advancing toward the removal end of the bed the higher settling rate particles that have stratified in the bottom portion of the bed.

3. The method of separating mineral particles of lower settling rate from mineral particles of higher settling rate, comprising establishing a horizontally elongated bed of the particles to be separated, introducing water and a mixture of the different settling rate particles to one end of the bed, removing water from the opposite end of the bed to establish a hydraulic flow which will effect horizontal advancement of the particles toward the last mentioned end of the bed, separately removing from the last mentioned end of the bed the particles of lowest settling rate and the particles of highest settling rate which have been stratified while advancing lengthwise of the bed, repeatedly subjecting the bed to cycles of vertically acting alternate pulsion and suction strokes of water to effect stratification of the particles in the bed with the highest settling rate particles on the bottom and the lowest settling rate particles on the top, and during the pulsion stroke of each cycle supplementing the horizontal particle advancing action of the aforesaid hydraulic flow by introducing water into the bottom portion of the bed in the form of a multiplicity of jets substantially parallel to the bottom of said bed and pointed toward the removal end of the bed, said jets being arranged in a plurality of transverse series with the different series spaced from each other lengthwise over substantially the entire bottom of the bed to assist in advancing toward the removal end of the bed the higher settling rate particles that have stratified in the bottom portion of the bed.

4. The method of separating mineral particles of lower settling rate from mineral particles of higher settling rate, comprising establishing a horizontally elongated bed of the particles to be separated, introducing water and a mixture of the different settling rate particles to one end of the bed, removing water from the opposite end of the bed to establish a hydraulic flow which will effect horizontal advancement of the particles toward the last mentioned end of the bed, separately removing from the last mentioned end of the bed the particles of lowest settling rate and the particles of highest settling rate which have been stratified while advancing lengthwise of the bed, repeatedly subjecting the bed to cycles of vertically acting alternate pulsion and suction strokes of water to gradually effect stratification of the particles as they advance lengthwise of the bed with the higher settling rate particles accumulating in the lower portion of the bed and the lower settling rate particles accumulating in the upper portion of the bed, and during the pulsion stroke of each cycle introducing water into the bottom of the bed as a plurality of transversely extending, longitudinally spaced series of jets substantially parallel to the bottom of said bed and pointed toward the removal end of the bed, with the spaced series of jets extending over the entire stratified portion of the material, to assist the aforesaid hydraulic flow in advancing toward the removal end of the bed the higher settling rate particles that have stratified in the bottom portion of the bed.

5. The method of separating mineral particles of lower settling rate from mineral particles of higher settling rate, comprising establishing a horizontally elongated bed of the particles to be separated, introducing water and a mixture of the different settling rate particles to one end of the bed, removing water from the opposite end of the bed to establish a hydraulic flow which will effect horizontal advancement of the particles toward the last mentioned end of the bed, separately removing from the last mentioned end of the bed the particles of lower settling rate and the particles of higher settling rate which have been stratified while advancing lengthwise of the bed, repeatedly subjecting the bed to cycles of vertically acting alternate pulsion and suction strokes of water to effect the stratification of the particles in accordance with their respective settling rates, and during the aforesaid pulsion stroke of each cycle subjecting the bed to pulsion strokes of water substantially parallel to its bottom and spaced longitudinally to extend over the entire stratified portion of the material, said parallel pulsion strokes being directed toward the removal end of the bed to increase the horizontal velocity of advancement of the higher settling rate particles in the lower portion of the bed over that produced by said hydraulic flow so as to bring about advancement of all of the particles throughout the depth of the bed at a uniform horizontal velocity.

6. The method of separating mineral particles according to their different settling rates, comprising establishing a horizontally elongated bed of the particles to be separated with the bed divided, transversely with reference to the direction of flow through the bed, into a first portion and a second portion, introducing water and a mixture of all of the different settling rate particles to the feed end of the bed, removing water from the exit end of the bed to establish a hydraulic flow for effecting horizontal advancement of mineral particles through the bed, repeatedly subjecting each portion of the bed to cycles of vertically acting pulsion and suction strokes of water to effect stratification of the particles in said portion in accordance with their respective settling rates, during the vertically acting pulsion stroke of each cycle for said first portion of the bed introducing a fluid into that bed portion in the form of a plurality of jets substantially parallel to the bottom of said bed and with all of the jets directed toward the feed end of the bed from longitudinally spaced locations extending over substantially the entire bottom of the bed to advance to said feed end in counter-current relation to the said hydraulic flow the particles that have settled to the bottom of the bed, removing from the feed end of the bed the particles that have been advanced thereto by the jets of water, during the vertically acting pulsion stroke of each cycle for said second portion of the bed introducing a fluid into that bed portion in the form of a plurality of jets substantially parallel to the bottom of said bed and with all of the jets directed toward the exit end of the bed from longitudinally spaced locations extending over the entire stratified portion of the material to assist the aforesaid hydraulic flow in advancing to said exit end the said stratified particles of higher settling rate, and separately removing from the exit end of the bed the stratified lower settling rate particles that have been advanced thereto by the hydraulic flow and the stratified higher settling rate particles that have been advanced thereto by the combined action of the hydraulic flow and the jets of water.

7. The method of separating mineral particles according to their different settling rates, comprising establishing a horizontally elongated bed of the particles to be separated with the bed divided, transversely with reference to the direction of flow through the bed, into a first portion and a second portion, introducing water and a mixture of all of the different settling rate particles to the feed end of the bed, removing water from the exit end of the bed to establish a hydraulic flow for effecting horizontal advancement of mineral particles through the bed, repeatedly subjecting each portion of the bed to cycles of vertically acting pulsion and suction strokes of water to effect stratification of the particles in said portion in accordance with their respective settling rates, during the vertically acting pulsion stroke of each cycle for said first portion of the bed introducing a fluid into that bed portion in the form of a plurality of transversely extending longitudinally spaced series of jets substantially parallel to the bottom of said bed and directed toward the feed end of the bed, with the spaced series of jets extending over substantially the entire bottom of the bed, to advance to said feed end in counter-current relation to the said hydraulic flow the particles that have settled to the bottom of the bed, removing from the feed end of the bed the particles that have been advanced thereto by the jets of water, during the vertically acting pulsion stroke of each cycle for said second portion of the bed introducing a fluid into that bed portion in the form of a plurality of transversely extending longitudinally spaced series of jets substantially parallel to the bottom of said bed and directed toward the exit end of the bed, with the spaced series of jets extending over the entire stratified portion of the material, to assist the aforesaid hydraulic flow in advancing to said exit end the said stratified particles of higher settling rate, and separately removing from the exit end of the bed the stratified lower settling rate particles that have been advanced thereto by the hydraulic flow and the stratified higher settling rate particles that have been advanced thereto by the combined action of the hydraulic flow and the jets of water.

8. The method of separating mineral particles according to their different settling rates, comprising establishing a horizontally elongated bed of the particles to be separated with the bed divided, transversely with reference to the direction of flow through the bed, into a first portion and a second portion, introducing water and a mixture of all of the different settling rate particles to the feed end of the bed, removing water from the exit end of the bed to establish a hydraulic flow for effecting horizontal advancement of mineral particles through the bed, repeatedly subjecting both portions of the bed to alternating cycles of vertically acting pulsion and suction strokes of water to effect stratification of the particles in said portions in accordance with their respective settling rates, during the aforesaid vertically acting pulsion stroke of each cycle for said first portion of the bed subjecting the latter to pulsion strokes of water substantially parallel to its bottom and spaced longitudinally over substantially its entire bottom, said parallel pulsion strokes being directed toward the feed end of the bed to advance to the latter end the particles that have settled to the bottom, removing from the feed end of the bed the particles that have been advanced thereto by said parallel pulsion strokes, during the vertically acting pulsion stroke of each cycle for said second portion of the bed subjecting the latter to pulsion strokes of water substantially parallel to its bottom and spaced longitudinally to extend over the entire stratified portion of the material, said parallel pulsion strokes being directed toward the removal end of the bed to increase the horizontal velocity of advancement of said stratified particles of higher settling rate at the bottom of this portion over that produced by said hydraulic flow so as to bring about advancement of all of the particles throughout the depth of said second portion at a uniform horizontal velocity, and separately removing from the exit end of the bed the stratified lower and higher settling rate particles that have been advanced thereto at a uniform horizontal velocity.

9. The method of separating mineral particles according to their different settling rates, comprising establishing a horizontal bed of the particles to be separated, introducing water and a mixture of different settling rate particles at one peripheral portion of the bed, removing water from an opposite peripheral portion of the bed to establish a hydraulic flow toward said opposite portion for effecting advancement of mineral particles through the bed, repeatedly subjecting the bed to cycles of vertically acting pulsion and suction strokes of water to effect stratification of the particles in accordance with their respective settling rates, during the vertically acting pulsion stroke of each cycle introducing a fluid into the bottom of the bed in the form of a plurality of spaced jets substantially parallel to the bottom of said bed and spaced to extend over the entire stratified portion of the material with all of the jets directed toward a removal zone in the bottom portion of the bed to advance to said removal zone those particles that have settled to the bottom of the bed, removing the particles that have been advanced by the jets of water to said removal zone, and separately removing from the upper portion of the bed the stratified lower settling rate particles that have been advanced through the bed by said hydraulic flow.

10. In a washing jig for separating mineral particles of different settling rates into two end products, in combination a wash box to receive a body of water, a partition extending lengthwise of the upper portion of the box to divide said portion into two main sections which communicate below said partition, substantially horizontal screen means in one of said main sections to support a bed of mineral particles of different settling rates, means for introducing water and a mixture of the different settling rate particles to one end of said bed, means for removing water from the opposite end of the bed to establish a hydraulic flow which will effect horizontal advancement of the bed lengthwise of the wash box and for separately removing the two end products with said water, means associated with the other main section of the wash box for pulsating the body of water through the apertures of the screen means and the bed to repeatedly subject the bed to cycles of vertically acting alternate pulsion and suction strokes of the water to effect stratification of the particles forming the bed in accordance with their respective settling rates, and means operating in timed relation with the pulsations of the body of water to introduce a plurality of jets of fluid into and in substantially parallel relationship with the bottom portion of the bed during the pulsion stroke of each cycle, said jet introducing means being spaced to extend over the entire stratified portion of the material to assist the aforesaid hydraulic flow in advancing toward the removal end of the bed the particles having the higher resistance to the said hydraulic flow.

11. In a washing jig for separating mineral particles of different settling rates into two end products, in combination a wash box to receive a body of water, a partition extending longitudinally of the upper portion of said box to divide said portion into two main sections which communicate below said partition, substantially horizontal screen means in one of said main sections to support a bed of mineral particles of different settling rates, means for introducing water and a mixture of the different settling rate particles to one end of said bed, means for removing water from the opposite end of the bed to establish a hydraulic flow which will effect horizontal advancement of the bed lengthwise of the wash box and for separately removing the two end products with said water, means associated with the other main section of the wash box for pulsating the body of water through the apertures of the screen means and the bed to repeatedly subject the bed to cycles of vertically acting alternate pulsion and suction strokes of the water to effect stratification of the particles forming the bed with the highest settling rate particles on the bottom and the lowest settling rate particles on the top, and means operating in timed relation with the pulsations of the body of water to introduce a fluid into the bottom portion of the bed during the pulsion stroke of each cycle to assist the aforesaid hydraulic flow in advancing toward the removal end of the bed the higher settling rate particles that have stratified in the bottom portion of the bed, said last mentioned means comprising a supporting frame formed of parallel side channels and transverse bars secured at their ends to the channels, a plurality of perforated plate sections extending between the side channels, means for supporting the plate sections on the transverse bars at different stepped levels to form transversely extending gaps between adjacent pairs of plates, and means partially closing each gap throughout its length to form a series of openings for directing jets of water over the top of the lower plate section of the pair.

12. In a washing jig for separating mineral particles of different settling rates into two end products, in combination a wash box to receive a body of water, a partition extending longitudinally of the upper portion of said box to divide said portion into two main sections which communicate below said partition, substantially horizontal screen means in one of said main sections to support a bed of mineral particles of different settling rates, means for introducing water and a mixture of different settling rate particles to one end of the bed, means for removing water from the opposite end of the bed to establish a hydraulic flow which will effect horizontal advancement of the bed lengthwise of the wash box and for separately removing the two end products with said water, means associated with the other main section of the wash box for pulsating the body of water through the apertures of the screen means and the bed to repeatedly subject the bed to cycles of vertically acting alternate pulsion and suction strokes of the water to effect stratification of the particles forming the bed with the highest settling rate particles on the bottom and the lowest settling rate particles on the top, and means operating in timed relation with the pulsations of the body of water to introduce water into the bottom portion of the bed in the form of a multiplicity of jets substantially parallel to said screen means and pointing toward the removal end of the bed, said jet introducing means being spaced throughout substantially the entire length of the screen means to assist the aforesaid hydraulic flow in advancing toward the removal end of the bed the higher settling rate particles that have stratified in the bottom portion of the bed.

13. In a washing jig for separating mineral particles according to their different settling rates, in combination a wash box to receive a body of water and having a main section, a transverse weir plate for dividing said main section into two alined chambers, substantially horizontal screen means in each of said chambers to support a bed of mineral particles, means for introducing water and a mixture of different settling rate particles into said wash box at the outer end of the first of said compartments, means for pulsating the body of water through the apertures of the screen means and the bed of mineral particles of each compartment to repeatedly subject said compartment bed to cycles of vertically acting pulsion and suction strokes of the water to effect stratification of the particles forming the bed in accordance with their settling rates, means for removing water from the upper portion of the outer end of the second of said compartments to establish a hydraulic flow through both of said compartments which will effect horizontal advancement of their beds of mineral particles, means for removing the lower settling rate particles with the water removed from the upper portion of the said second compartment, means operating during the pulsion stroke of each cycle in the said first compartment to introduce a plurality of jets of fluid into and in substantially parallel relationship with the bottom of the bed, said jet introducing means being spaced over substantially the entire length of the screen means in the first compartment and directed toward the outer end of the said compartment to advance to said outer end the particles settled to the bottom of the bed in counter-current relation to said hydraulic flow, means for removing from the outer end of the first compartment the settled particles that have been advanced thereto by the jets of fluid, means operating during the pulsion stroke of each cycle in the said second compartment to introduce a plurality of jets of fluid into and in substantially parallel relationship with the bottom of the bed, said jet introducing means being longitudinally spaced to extend over the entire stratified portion of the material and directed toward the outer end of said compartment and in the direction of said hydraulic flow to assist the latter in advancing to said outer end the particles that have settled to the bottom of the bed, and means for removing from the outer end of the second compartment the settled particles that have been advanced thereto by the jets of fluid and the hydraulic flow.

14. In a washing jig for separating mineral particles according to their different settling rates, in combination a wash box to receive a body of water and having a main section, substantially horizontal screen means mounted in said main section to support a bed of mineral particles, means for introducing water and a mixture of different settling rate particles to one end of said bed, means for pulsating the body of water through the apertures of the screen means and the bed of mineral particles to repeatedly subject said bed to cycles of vertically acting pulsion and suction strokes of the water to effect stratification of the particles forming the bed in accordance with their settling rates, means for removing water from the upper portion at the opposite end of the bed to establish a hydraulic flow which will effect horizontal advancement of the lower settling rate particles in the upper portion of the bed, means for removing the lower settling rate particles with the water removed from the upper portion of the bed, means operating during the pulsion stroke of each cycle to introduce a plurality of jets of fluid at spaced locations extending over substantially the entire length of said screen means into the bottom of the bed in substantially parallel relationship with said screen means and directed toward the first mentioned end of said bed to advance thereto the particles settled to the bottom of the bed in counter-current relation to said hydraulic flow, and means for removing from the first mentioned end of the bed the settled particles that have been advanced thereto by the jets of fluid.

15. In a washing jig for continuously separating mineral particles of different settling rates into two end products by subjecting an advancing bed of the particles to the stratifying action of the pulsion and suction strokes of a pulsating body of water, the improvement which comprises screen means for supporting the advancing bed of mineral particles having vertically directed apertures through which the pulsating water passes in producing the stratifying action on the mineral particles of the bed, and means for introducing a multiplicity of jets of water substantially parallel to and immediately above said screen means at spaced locations extending over the entire stratified portion of the material to assist in advancing the higher settling rate particles that have become stratified in that portion of the bed.

16. In a washing jig for continuously separating mineral particles of different settling rates into two end products by subjecting an advancing bed of the particles to the stratifying action of the pulsion and suction strokes of a pulsating body of water, the improvement which comprises a mineral bed supporting screen formed of a plurality of transverse plate sections arranged in spaced, stepped relation with each plate section having vertically directed apertures through which the pulsating water passes in producing the stratifying action on the mineral particles of the bed, and a plurality of separate fingers arranged along one longitudinal edge portion of each plate section with the alternate fingers inclined downwardly relative to the remainder of the plate section for contact with the edge portion of the next adjacent plate section to close at regular intervals throughout its length the space between each adjacent pair of plate sections, the openings between said downwardly inclined fingers directing jets of water over the top of the lower plate section of the pair to assist in advancing the higher settling rate particles in the bottom portion of the bed.

17. In a washing jig for continuously separating mineral particles of different settling rates into two end products by subjecting an advancing bed of the particles to the stratifying action of the pulsion and suction strokes of a pulsating body of water, the improvement which comprises a mineral bed supporting screen formed of a plurality of transverse plate sections arranged in stepped relation with each plate section having a multiplicity of vertically directed apertures through which the pulsating water passes in producing the stratifying action on the mineral particles of the bed, and means operatively associated with the edge portions of adjacent plate sections for introducing a multiplicity of substantially horizontally directed jets of water into the portion of the bed immediately above the screen to assist in advancing the higher settling rate particles that have become stratified in that portion of the bed.

18. In a washing jig for continuously separating mineral particles of different settling rates into two end products by subjecting an advancing bed of the particles to the stratifying action of the pulsion and suction strokes of a pulsating body of water, the improvement which comprises a mineral bed supporting screen formed of a plurality of transverse plate sections arranged in stepped relation with each plate section having a multiplicity of vertically directed apertures through which the pulsating water passes in producing the stratifying action on the mineral particles of the bed, and means operatively associated with the edge portions of each adjacent pair of plate sections for introducing into the bottom portion of the bed a transversely alined series of substantially horizontally directed jets of water to assist in advancing the higher settling rate particles that have become stratified in that portion of the bed.

19. A material bed supporting screen structure for washing jigs, comprising a supporting frame formed of parallel side channels and transverse bars secured at their ends to the channels, a plurality of perforated plate sections extending between the side channels, means for supporting the plate sections on the transverse bars at different stepped levels to form transversely extending gaps between adjacent pairs of plate sections, and means partially closing each gap throughout its length to form a series of openings for directing jets of water over hte top of the lower plate section of the pair.

20. A material bed supporting screen structure for washing jigs, comprising a supporting frame formed of parallel side channels and transverse bars secured at their ends to the channels, a plurality of perforated plate sections extending between the side channels, each plate section having one longitudinal edge portion inclined downwardly, means for supporting the plate sections on said frame at different stepped levels with the said inclined edge portion of each plate section underlying the plain edge portion of the next adjacent plate section, to form transversely extending gaps between said overlapping edge portions, and a series of uniformly spaced filler members secured in each of said gaps to form a plurality of openings for directing jets of water over the top surface of the lower plate section of the pair.

21. A material bed supporting screen structure for washing jigs, comprising a supporting frame, a plurality of separate perforated plates extending across said frame, means for connecting said plates to said frame to mount the plates with their adjacent edge portions overlapped at different stepped levels to form a restricted, transverse space between each adjacent pair of plates, and means for closing said transverse space at regular intervals throughout their lengths to form a series of openings immediately adjacent the lower plate of each adjacent pair of plates for directing jets of water over the top of said lower plate.

22. A material bed supporting screen structure for washing jigs, comprising a supporting frame, a plurality of perforated plates extending across said frame and each having one longitudinal edge portion inclined downwardly, means for connecting said plates to said frame to mount the plates at different stepped, spaced levels with the said inclined edge portions underlying the edge portions of the next adjacent plates, and means for closing at regular intervals throughout its length the space between each adjacent pair of plates to form a series of openings for directing jets of water over the top of the lower plate of the pair.

23. A material bed supporting screen structure for washing jigs, comprising a supporting frame, a plurality of perforated plates extending across said frame, each plate having one longitudinal edge portion formed with a plurality of separate fingers with alternate fingers inclined downwardly relative to the remainder of the plate, means for connecting said plates to said frame to mount the plates at different stepped, spaced levels with said downwardly inclined fingers of each plate contacting the edge portion of the next adjacent plate to close at regular intervals throughout its length the space between each adjacent pair of plates to form a series of openings for directing jets of water over the top of the lower plate of the pair.

CHARLES W. LOTZ.

REFERENCES CITED

The following references are of record in the file of this patent:

UNITED STATES PATENTS

| Number | Name | Date |
| --- | --- | --- |
| 268,491 | Hubbell | Dec. 5, 1882 |
| 534,467 | Christ | Feb. 19, 1895 |
| 1,058,349 | Bookwalter | Apr. 8, 1913 |
| 1,118,239 | Schuchard | Nov. 24, 1914 |
| 1,161,733 | Riley | Nov. 23, 1915 |
| 1,327,537 | Elmore | Jan. 6, 1920 |
| 1,360,116 | King | Nov. 23, 1920 |
| 1,865,726 | Sayers | July 5, 1932 |

FOREIGN PATENTS

| Number | Country | Date |
| --- | --- | --- |
| 634,431 | Germany | Aug. 27, 1936 |